C. B. CASNER.
STATION INDICATOR.
APPLICATION FILED MAY 3, 1907.

914,550.

Patented Mar. 9, 1909.
6 SHEETS—SHEET 1.

Witnesses:
R. E. Hamilton
E. B. House

Inventor
Clinton B. Casner,
By His Attorney
Warren D. House

C. B. CASNER.
STATION INDICATOR.
APPLICATION FILED MAY 3, 1907.
914,550.
Patented Mar. 9, 1909.
6 SHEETS—SHEET 2.
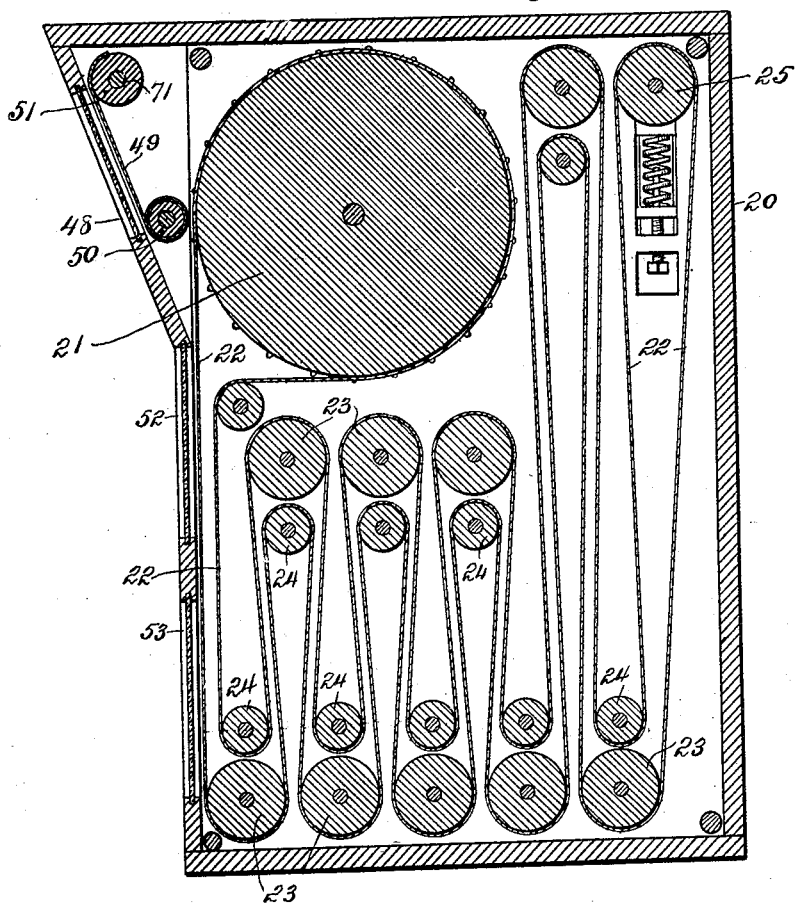
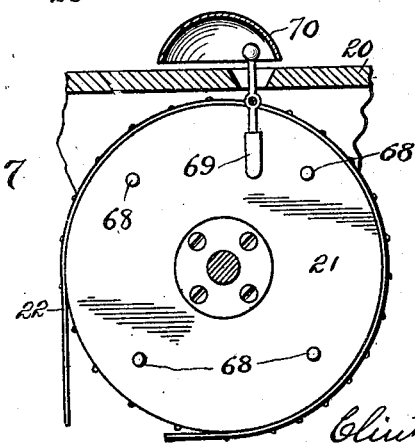

C. B. CASNER.
STATION INDICATOR.
APPLICATION FILED MAY 3, 1907.

914,550.

Patented Mar. 9, 1909.
6 SHEETS—SHEET 3.

Witnesses:
R. E. Hamilton
E. B. House

Inventor
Clinton B. Casner
By His Attorney
Warren D. House

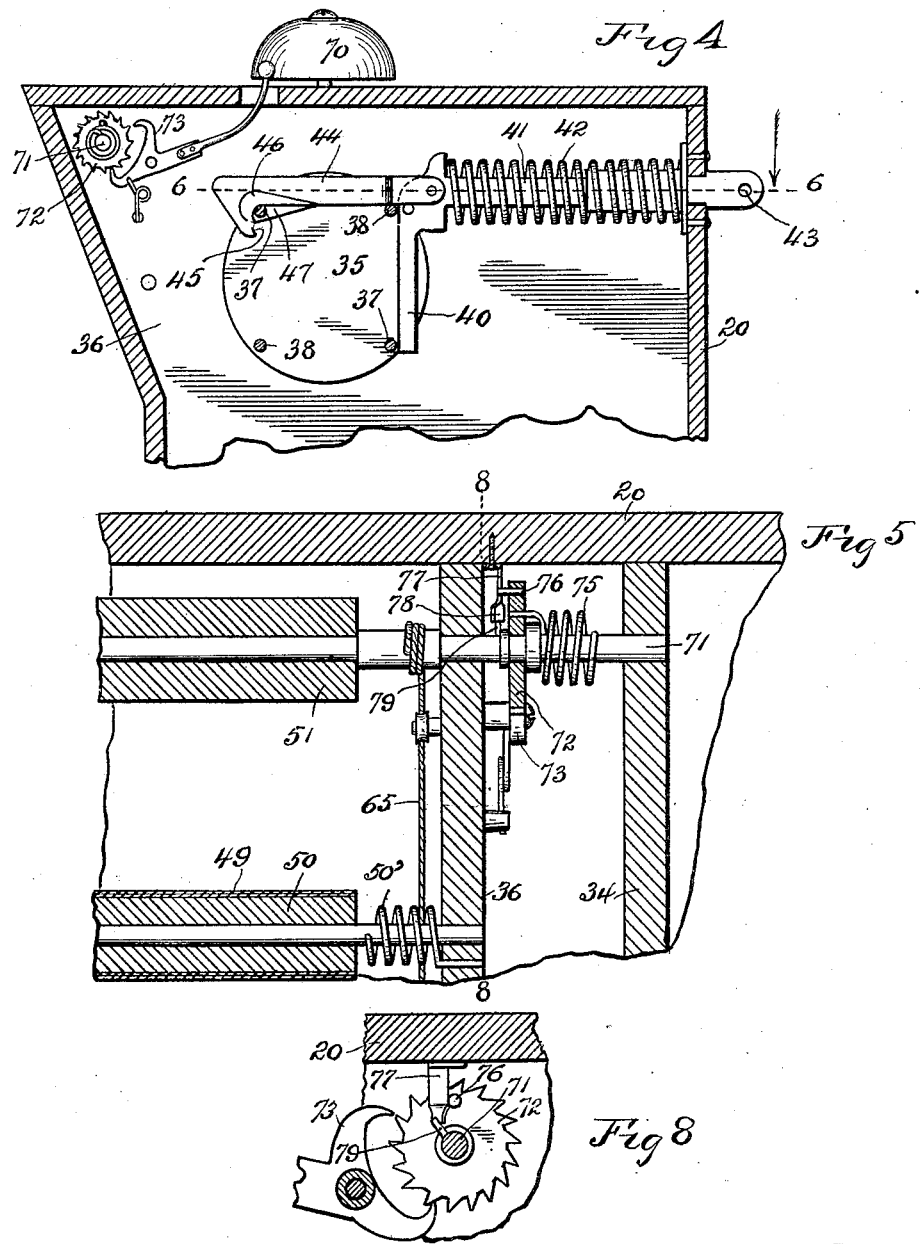

C. B. CASNER.
STATION INDICATOR.
APPLICATION FILED MAY 3, 1907.
914,550.
Patented Mar. 9, 1909.
6 SHEETS—SHEET 5.
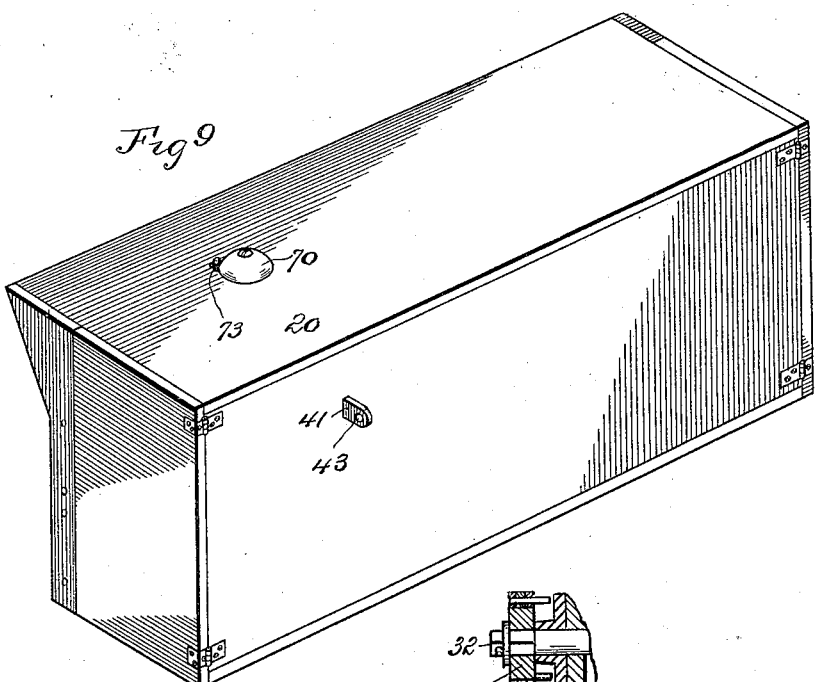
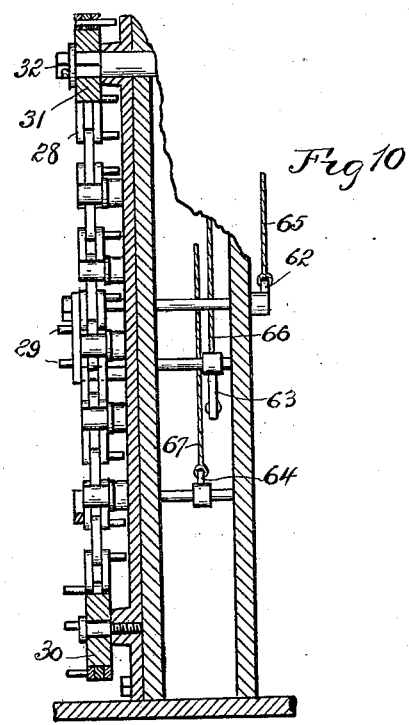
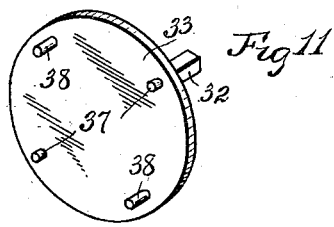
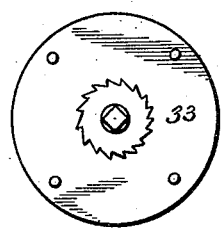
Witnesses:
R. E. Hamilton
E. B. House
Inventor
Clinton B. Casner,
By His Attorney Warren D. House C. B. CASNER.
STATION INDICATOR.
APPLICATION FILED MAY 3, 1907.
914,550.
Patented Mar. 9, 1909.
6 SHEETS—SHEET 6.
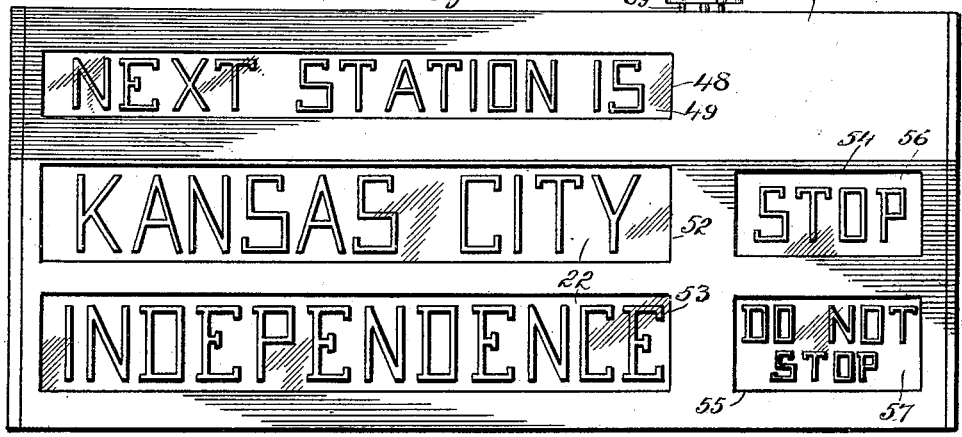
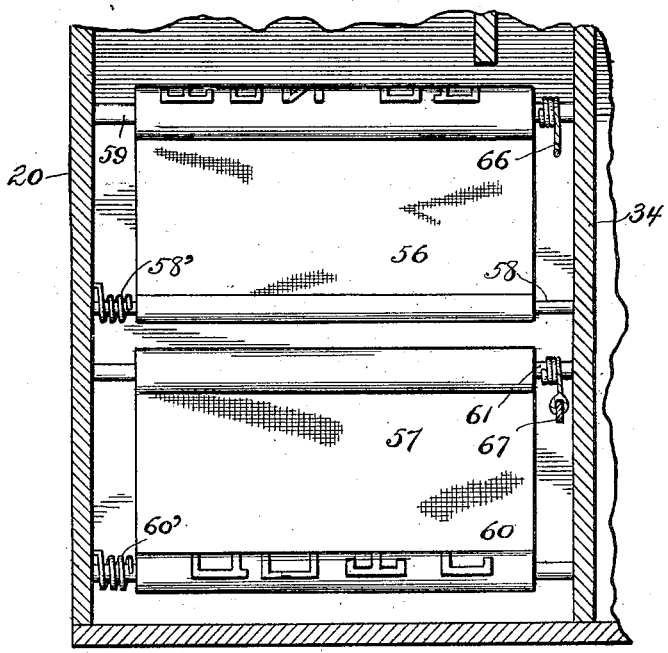
Witnesses:
R. E. Hamilton.
E. B. House.
Inventor
Clinton B. Casner,
By His Attorney
Warren D. House.

UNITED STATES PATENT OFFICE.

CLINTON B. CASNER, OF KANSAS CITY, MISSOURI.

STATION-INDICATOR.

No. 914,550.   Specification of Letters Patent.   Patented March 9, 1909.

Application filed May 3, 1907. Serial No. 371,666.

*To all whom it may concern:*

Be it known that I, CLINTON B. CASNER, a citizen of the United States, residing at Kansas City, in the county of Jackson and State of Missouri, have invented certain new and useful Improvements in Station-Indicators, of which the following is a specification.

This invention relates to improvements in station indicators, and relates particularly to that class of inventions in which the station which the car or train is approaching is indicated visually.

The invention has for its object the provision of simple and improved means whereby the names of the successive stations may be conveniently displayed.

A further object is to provide means for exhibiting the names of a plurality of stations and indicating at which stations the train will stop and also those at which stops will not be made.

A further object is to provide operating means by which the display device and means for indicating whether or not the train will stop are simultaneously operated.

The peculiar and novel features of the invention will be hereinafter fully described and claimed.

Figure 1:
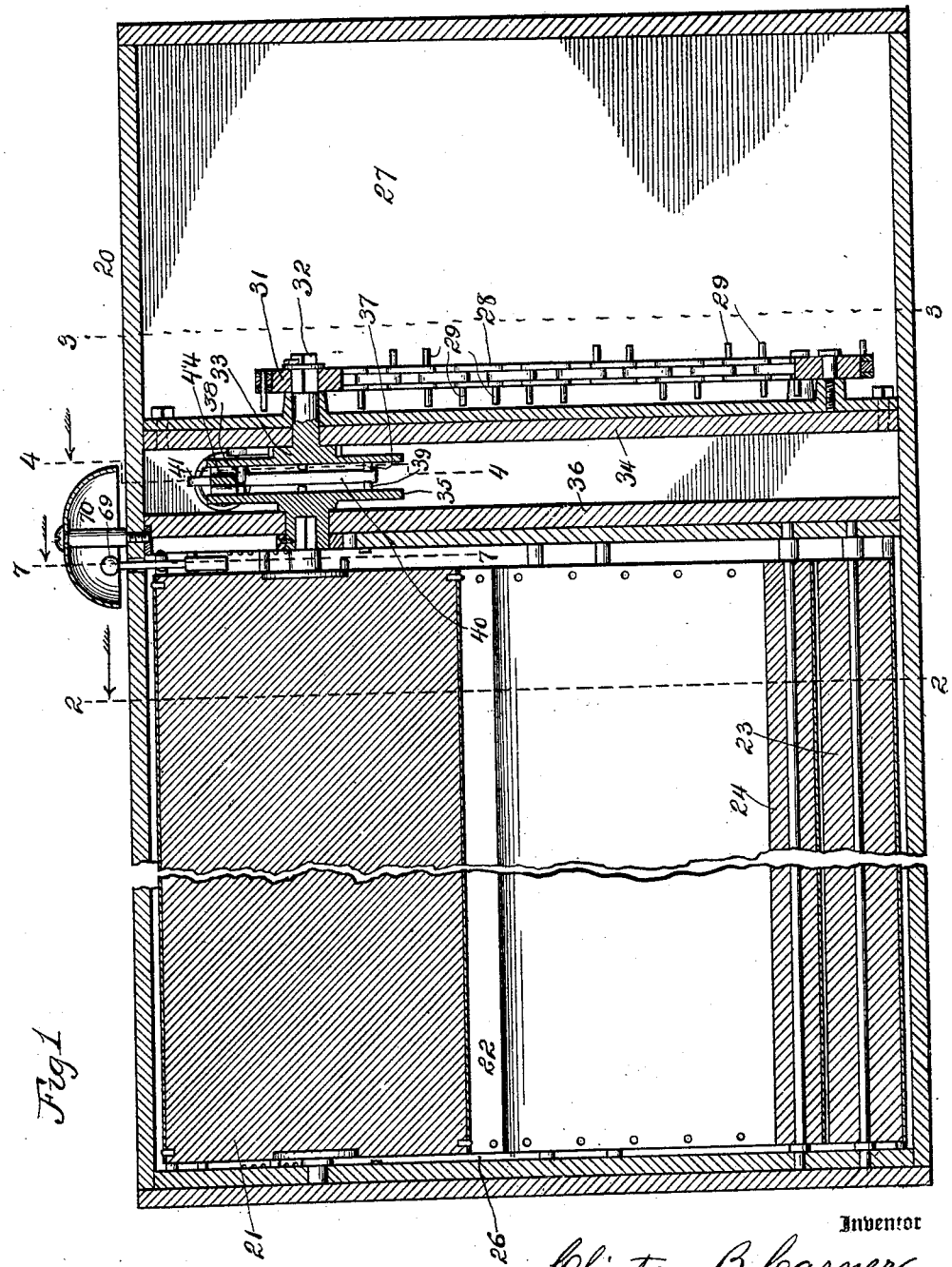
Figure 3:
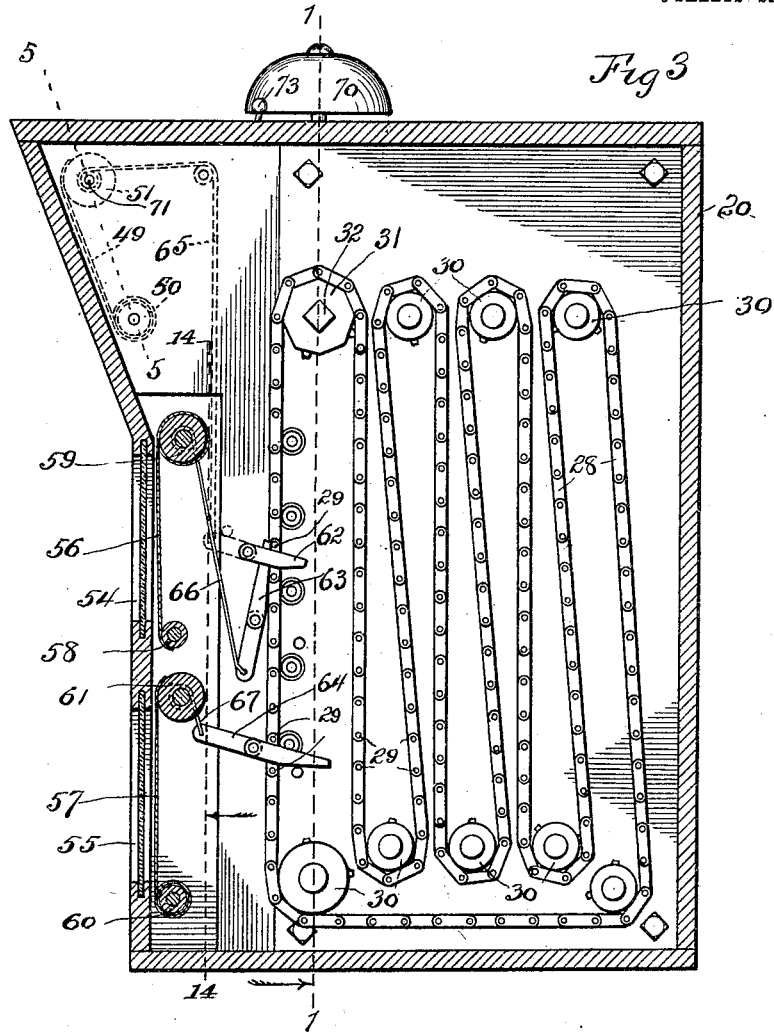
Figure 6:
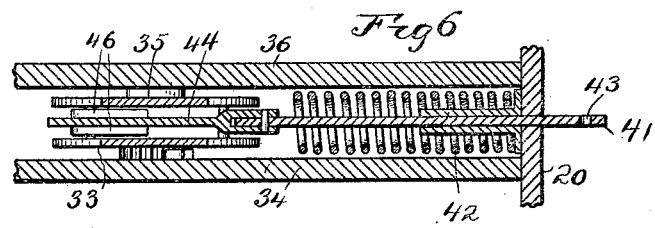

In the accompanying drawings illustrating the invention, Figure 1 is a longitudinal vertical sectional view taken on the dotted line 1—1 of Fig. 3 looking in the direction indicated by the arrow adjacent to said dotted line. Fig. 2 is a cross section on dotted line 2—2 of Fig. 1. Fig. 3 is a cross section on dotted line 3—3 of Fig. 1. Fig. 4 is a section on the dotted line 4—4 of Fig. 1. Fig. 5 is a sectional view on the dotted line 5—5 of Fig. 3. Fig. 6 is a horizontal sectional view on the dotted line 6—6 of Fig. 4. Fig. 7 is a vertical section on line 7—7 of Fig. 1. Fig. 8 is a fragmentary vertical section on line 8—8 of Fig. 5. Fig. 9 is a perspective view of the casing of the indicator. Fig. 10 is a sectional view on the line 1—1 of Fig. 3 looking in a direction opposite to that denoted by the arrow adjacent to said line. Figs. 11 and 12 are details. Fig. 13 is a face view illustrating the indicator openings, and Fig. 14 is a sectional view on line 14—14 of Fig. 3.

Similar characters of reference denote similar parts.

Referring to the drawings, 20 designates a casing in which is mounted a drum 21 around which passes an endless belt 22 containing the names of the various stations. Said belt is passed over a series of rolls 23 and 24 and over a tension roller 25 as is clearly indicated in Fig. 2. Said drum and rolls are journaled in the end walls of a chamber 26 of said casing. In a chamber 27 of said casing is supported an endless chain 28 made in the form of a sprocket chain, the links thereof being united by pins 29. It will be observed that said pins are of a length greater than the thickness of said chain, and they are so supported that they may be moved from one side to the other as indicated in Figs. 3 and 10. Said chain is supported by sprocket wheels 30. A sprocket 31 mounted on a shaft 32 forming a part of a disk 33 serves to impart movement to said chain. The shaft 32 is mounted in a bearing in the end wall 34 of the chamber 27, and a similar disk 35 is mounted in the end wall 36 of the chamber 26, the end walls 34 and 36 are spaced apart as indicated in Fig. 3, to form a chamber for the accommodation of the disks. The hub of disk 35 is secured to the shaft of drum 21. The disk 33 is provided with four pins 37 and 38, arranged in pairs, the pins 37 being shorter than the pins 38. The disk 35 is also provided with four pins 39, all of the same length.

As shown in Fig. 4, the disks 33 and 35 are normally held against rotation by a downwardly extending arm 40 which engages the rear of two pins on each disk. The arm 40 projects from a horizontal member 41, slidably mounted in the casing 20, and normally held with the arm 40 against the pins, by means of a coil spring 42 encircling the member 41 and bearing at its rear end against the inner wall of the casing 20. The rear end of the member 41 is provided with an eye 43, to receive a cord, or the like, whereby said member may be retracted. To the forward end of member 41 is pivoted the rear end of a horizontal plate 44, having at its forward end a hook 45, adapted to engage only the two longer pins 38 in the disk 33. To the opposite sides of the plate 44 are secured two cheek plates 46 each of which at its forward end is provided with a hook. The hooked forward ends of the cheek plates 46 are adapted to engage respectively the pins 39 on the disk 35 and the short pins 37 on the disk 33. At such times as the long pins 38 engage the lower edge of the plate 44 the pins 39 on the disk 35 will not be engaged by the adjacent cheek plate 46, but at other times the short pins 37 on the disk 33 and the pins 39 on the disk 35 will enter the recesses 47 formed below the cheek plates 46 and will be respectively engaged by the hooked forward ends of said cheek plates. It will be seen, therefore, that when a long pin 38 of the disk 33 engages the hook 45 of the plate 44 and the member 41 is retracted the disk 33 alone will be rotated. When the short pins 37 of the disk 33 and the pins 39 of the disk 35 engage the cheek plates 46 and the member 41 is retracted, both disks 33 and 35 will be rotated. The pins 37 and 39 are not long enough to be engaged by the hook 45 of the plate 44, but are long enough to be engaged by the cheek plates 46 respectively. The pins 38, however, are of sufficient length to engage the lower edge of the plate 44, thus supporting the pivoted plate 44 in a position such that the pins 39 on the disk 35 will be out of the path of movement of the adjacent cheek plate 46. As every other pin on disk 33 is a long one, and as all the pins 39 on the disk 35 are short and cannot engage the hook 45, it will be obvious that successive retractions of the member 41 will successively rotate the disk 33 and therefore drive the belt 28, while the disk 35 will be rotated only during alternate retractions of the member 41. Therefore, for every retraction of the member 41, the endless chain 28 will be driven, while the belt 22 will be driven, during alternate retractions of the member 41.

The casing 20 is provided in its forward side with a plurality of indicating openings, the opening 48 being designed to display such words as "Next station is" and "This station is", said words being placed upon a belt 49, the words "Next station is" being placed on the belt above the words "This station is". The belt 49 is secured at one end to a spring retracted roller 50, suitably supported in the casing 20 and having secured thereto one end of a coil spring 50', the other end of which is secured to the partition 36 in which one end of the roller 50 is rotatively mounted. The other end of the belt 49 is secured to the periphery of a drum 51, having one end rotatively mounted in the casing 20, the other end being rotatively mounted in the partition 36.

The opening 52 is designed to have indicated therethrough the station which the train is approaching and the opening 53 is designed to have indicated therethrough the name of the next following station, the names of the stations being placed consecutively on the forward side of the belt 22.

Through the openings 54 and 55 are displayed indicating signals such as "Stop" and "Do not stop", whereby the passengers are informed at what stations the train will and will not stop. On each of two belts 56 and 57 are placed the words "Stop" and "Do not stop", the words "Do not stop" being placed above the word "Stop," the arrangement being such that but one of these indications will appear at one time at either the opening 54 or 55. The belt 56 has one end secured to a spring retracted roller 58, the other end being secured to the periphery of the drum 59. Said roller 58 and drum 59 have their ends rotatively mounted in the casing 20 and the partition 34. The belt 57 is secured at one end to a spring retracted roller 60 and at the other end to a drum 61, the ends of said rollers 60 and drum 61 being rotatively mounted in the casing 20 and partition 34, as shown in Fig. 14. Two coil springs 58' and 60' encircle respectively the rollers 58 and 60 and have one set of ends secured respectively to said rollers, the other set of ends being secured to the casing 20.

Pivotally mounted in any suitable manner in the casing 20 are levers 62, 63 and 64, each adapted to have its rear end engaged and raised by the projecting pins 29 on the chain belt 28. The forward end of the lever 62 is connected by a cord 65 to the periphery of the drum 51, as shown in Figs. 3 and 5. A cord 66 is connected to the forward end of the lever 63 and to the periphery of the drum 59. A cord 67 is connected to the forward end of the lever 64 and to the periphery of the drum 61. When the rear ends of levers 63 and 64 are raised by projecting pins 29, the belts 56 and 57 will be moved to a position in which the indication "Stop" will show through the openings 54 and 55. When the lever 62 is operated by the projecting pins 29 the belt 49 will be moved to show the indication, "This station is" through opening 48.

At one end of the drum 21 are provided a plurality of pins 68 arranged to consecutively strike the lower end of a striker 69 of a bell 70, mounted upon the upper side of the casing 20. The pins 68 are also so arranged that an alarm will be given each time the indicator is operated to denote a change of stations.

On the end of the shaft 71 which forms a part of the drum 51, is mounted rotatively a disk 72 having peripheral teeth which, when the disk is rotated, engage and swing a striker 73 pivoted on the partition 36 and having its other end adapted to strike the bell 70.

As shown in Figs. 5 and 8, a coil spring 75 encircles the shaft 71, to which one end of the spring is secured, the other end of the spring being secured to the disk 72. A pin 76 carried by the disk 72, normally engages a spring stop plate 77, the upper end of which is secured to the casing 20 and the lower end of which is provided with a cam portion 78. A radial pin 79 is secured to the shaft 71 in a position such that it will strike the cam 78 when the shaft 71 has been rotated by a pin 29 on the chain belt 28, swinging the lever 62. When the pin 79 strikes the cam 78 the spring plate 77 will be swung so as to release the pin 76, thereby permitting the spring 75, which has been wound by rotating the shaft 71, to rapidly rotate the toothed disk 72 until the pin 76 again strikes and is stopped by the spring plate 77. Thus, every time the lever 62 is swung so as to move the belt 49 to a position in which the indication "This station is" will appear at the opening 48, the striker 73 will be operated by the toothed disk 72 to rapidly strike the bell 70 and thus notify the passengers that a station has been reached, the name of which appears at the opening 52.
In the operation of my invention, the pins 29, which are located in the proper places in the chain belt 28 to give the proper indications in their proper consecutive order, are slid horizontally so as to project to the right, as viewed in Fig. 1, so as to consecutively strike the levers 64, 63 and 62. The remaining pins 29 are then forced to the left, as viewed in said figure, so as not to strike said levers when the belt 28 is driven by the retraction of the member 41.

Referring to Fig. 3, it will be observed that the lever 62 is shorter in that portion disposed at the rear of the pivotal point of the lever than the corresponding portions of the levers 63 and 64. The disposition of the pivotal points of the three levers and the length of the rearwardly extending portions of said levers are such that three movements of the chain are required to have one of the pins 29 swing and be released from either lever 63 or 64, while but two movements of the chain are required to cause a pin 29 to engage, swing and be released from the lever 62. In the operation of the apparatus, in indicating "a stop" station, the member 41 is retracted thereby effecting a forward movement of the chain belt 28 and the belt 22, thus causing the "stop" station to appear at the opening 53 and at the same time a pin 29 on the chain 28 will swing upwardly the rear end of the lever 64, thereby moving the belt 57 to a position in which the word "Stop" will appear at the opening 55. A second retraction of the member 41 will effect a forward movement of the chain 28 but not to a position in which the lever 64 will be released from the pin 29 which engages it. As hereinbefore described, this second movement of the member 41 will not effect a forward movement of the belt 22. A third retraction of the member 41 will effect a forward movement of both belts 22 and 28, thus presenting the "stop" station before the opening
52. At the same time the pin 29, which during this movement of the chain 28 is released from the lever 64, engages and swings the lever 63 to the position shown in Fig. 3, thereby moving the belt 56 so that the word "Stop" appears at the opening 54. Another retraction of the member 41 will not effect a movement of the belt 22, but will effect another movement of the belt 28 and will cause the pin 29, which is still engaged with the lever 63 to engage and swing the lever 62, thereby moving the belt 49 so that the words "This station is" will appear at the opening 48. Another retraction of the member 41 will effect forward movement of both belts 22 and 28 and at the same time will effect the releasing of the levers 62 and 63 from the pin 29 which has until this time engaged said levers.

From the above description it will be seen that five retractions of the member 41 are required to cause a single pin 29 on the belt 28 to perform its various functions in indicating a "stop" station.

Assuming that the stations "Kansas City" and "Independence" are relatively located as shown in Fig. 13, and that "Kansas City" is a stop station, while "Independence" is not, the operation of the device is as follows:—Further assuming that a station has just been left by the train and that "Kansas City" is the second station on the belt 22 from the one appearing at opening 52, the disks 33 and 35 will be disposed so that two short pins 37 and 39 on said disks will be located in the recesses 47 so as to be respectively engaged by the cheek plates 46. If the member 41 be now retracted the disks 33 and 35 will be rotated, thereby driving the belts 22 and 28, thus causing "Kansas City" to appear in the lower opening 53 and "Kansas City" being a stop station, one of the pins 29 in the chain belt 28 will swing the lever 64, thereby moving the belt 57 so as to show the word "Stop" in opening 55, indicating that the train will stop at "Kansas City." When the train arrives at the town preceding "Kansas City" and which will be indicated at this time in opening 52, the operator will again retract the member 41 which will cause the plate 44 to engage a long pin 38 on the disk 33, thereby rotating disk 33 and again driving the belt 28, but not advancing the belt 22, as the pins 39 will not be engaged by the cheek plate 46. The pin 29 which has engaged the lever 64 will still hold said lever so that "Stop" will still appear opposite the station "Kansas City", which station is still indicated in the lower opening 53. As soon as the train leaves the station preceding "Kansas City" and which is still showing in opening 52, the operator again retracts the member 41. At this time short pins 37 and 39 will engage the cheek plates 46 and both belts 22 and 28 will be driven, thus causing "Kansas City" to appear at opening 52, and causing the pin 29 which has previously engaged the lever 64 to engage lever 63, thereby causing belt 56 to move so as to disclose "Stop" in opening 54 opposite "Kansas City." At the same time "Independence" will appear at opening 53, and this not being a stop station, lever 64 will not be struck by a pin, but being released from the pin which previously swung it, will permit the spring 60' to retract roller 60 and cause belt 57 to display "Do not stop" at opening 55. As the train enters "Kansas City" the member 41 is again retracted thus driving chain belt 28, but as a long pin 38 is engaged by the hook 45, the belt 22 will not be moved, but the pin which first struck lever 64 will engage lever 62 and cause the indication "This station is" to appear at opening 48, said pin, however, still holding the lever 63 so that "Stop" still appears at opening 54. At the same time, as hereinbefore described, the bell 70 will be actuated by the striker 73. If after leaving "Kansas City", the member 41 is again retracted, the pins 37 and 39 will be engaged by the cheek plates 46 and belts 22 and 28 will be simultaneously driven, thereby causing "Independence" to appear in opening 52 and the pin 29 which first struck lever 64 to leave lever 63, thereby permitting roller 58 to retract belt 56 and causing "Do not stop" to appear in opening 54, showing that "Independence" is not a stop station.

The advantages of my improved station indicator are obvious. It will be observed that I have provided simple and improved means for indicating the successive stations, and means for indicating at which stations the train will or will not stop. And further that I have provided means for readily altering the arrangements should the schedules be changed to make stops at stations not previously provided for. A further advantage lies in the arrangement of the stations upon an endless belt which is passed over a plurality of guiding drums. It will also be observed that I have provided means for giving an alarm each time a change of station is indicated, and for giving an alarm at each stop.

I claim as my invention:—

1. A station indicator comprising a main belt containing indicating matter, a plurality of supplemental belts also containing indicating matter pertaining to the indicating matter on the main belt, a sprocket chain provided with projecting pins for operating said supplemental belts, and means for operating said main belt and said chain.

2. A station indicator comprising a main belt containing indicating matter, a plurality of supplemental belts also containing indicating matter pertaining to the indicating matter on the main belt, a sprocket chain provided with slidable pins for operating said supplemental belts, and means for operating said main belt and said chain.

3. A station indicator comprising a main belt containing indicating matter, a plurality of supplemental belts also containing indicating matter pertaining to the indicating matter on the main belt, pivoted levers for operating said supplemental belts, a sprocket chain provided with means for operating said levers, and means for operating said main belt and said sprocket chain.

4. A station indicator comprising a main belt containing indicating matter, a plurality of supplemental belts also containing indicating matter pertaining to the indicating matter on the main belt, levers for operating said supplemental belts, a sprocket chain, pins carried by said chain for operating said levers, and means for simultaneously operating said main belt and said chain.

5. A station indicator comprising a main belt containing indicating matter, a plurality of supplemental belts also containing indicating matter pertaining to the indicating matter on the main belt, means for holding said supplemental belts under normal spring tension, levers controlling said supplemental belts, and means for operating the main belt and said levers.

6. A station indicator comprising a main belt containing indicating matter, a plurality of supplemental belts also containing indicating matter pertaining to the indicating matter on the main belt, levers for operating said supplemental belts, a chain provided with pins for engaging and swinging said levers, and means for operating said main belt and said chain.

7. A station indicator comprising a main belt containing indicating matter, a drum for operating the same, a disk secured to said drum, a plurality of supplemental belts containing indicating matter pertaining to the indicating matter on the main belt, a chain for operating the same, a disk for operating said chain, and means for simultaneously engaging said disks to rotate the same.

8. A station indicator comprising a main belt containing indicating matter, a drum for operating the same, a disk on said drum provided with pins, supplemental belts containing indicating matter pertaining to the indicating matter on the main belt, a chain for operating the same, a disk for operating said chain also provided with pins, and means for engaging the pins of said disks to rotate the latter.

9. A station indicator comprising a main belt containing indicating matter, a drum for operating the same, a disk secured to said drum and having pins of uniform length, a plurality of supplemental belts containing indicating matter pertaining to the indicating matter on the main belt, a disk operating the same provided with a plurality of pins of different lengths, and means for engaging said pins to operate said disks.

10. A station indicator comprising a main belt containing indicating matter, a disk for operating the same, a plurality of supplemental belts containing indicating matter pertaining to the indicating matter on the main belt, a second disk for operating said supplemental belts, and an operating member for rotating said disks and provided with means to hold said disks normally against rotation.

11. A station indicator comprising a main belt containing indicating matter, a disk for operating the same, a plurality of supplemental belts containing indicating matter pertaining to the indicating matter on the main belt, a second disk for operating the supplemental belts, said disks having pins, and an operating member engaging said pins to rotate said disks, said operating member having means for normally holding said disks from rotating.

12. A station indicator comprising a main belt containing indicating matter, a disk for operating the same, provided with a plurality of pins of uniform length, a plurality of supplemental belts containing indicating matter pertaining to the indicating matter on the main belt, a disk for operating said supplemental belts, and provided with pins of different length, and an operating member engaging said pins to operate said disks.

13. A station indicator comprising a main belt containing indicating matter, a disk for operating the same, supplemental belts containing indicating matter pertaining to the indicating matter on the main belt, a second disk for operating the latter belts, said disks being provided with pins, an operating member provided with a stop arm to normally engage said pins and prevent rotation of said disks, and means for withdrawing said stop member and simultaneously rotating said disks.

14. A station indicator comprising a main belt containing indicating matter, a disk for operating the same, supplemental belts containing indicating matter pertaining to the indicating matter on the main belt, a second disk for operating the latter belts, pins on said disks, and an operating member provided with cheek plates to engage said pins.

15. A station indicator comprising a main belt containing indicating matter, a disk for operating the same provided with pins, supplemental belts containing indicating matter pertaining to the indicating matter on the main belt, a disk for operating the latter belts and provided with pins of varying lengths, an operating member provided with cheek plates to engage the pins of the main belt operating disk and the shorter pins of the supplemental belt operating disk, and a hook portion to engage the longer pins on the latter disk.

16. In a station indicator, an indicating belt, a drum on which said belt is wound, means for rotating said drum, a rotary disk, means for releasably holding said disk against rotation, a spring connected to said drum and said disk, a striker operated by said disk, an alarm operated by said striker, and means for periodically releasing said disk to operate said alarm.

17. In a station indicator, the combination with means for indicating the names of stations consecutively, of supplemental means for indicating whether or not a stop is to be made at a station indicated by the station indicating means, and means for actuating both of said indicating means in conjunction with each other.

18. In a station indicator, the combination with means for indicating the names of stations in consecutive order, of means for indicating whether or not a stop is to be made at a station indicated by the station indicating means, means for actuating the station indicating means, adjustable means for actuating the second named indicating means, and means for operating the two actuating means in conjunction with each other.

19. In a station indicator, the combination with means for indicating the names of stations, of supplemental means for indicating whether or not a stop is to be made at a station indicated by said station indicating means, an endless belt provided with devices adjustable thereon to and from positions in which they will actuate the supplemental means, means for actuating the station indicating means, and means for operating the said actuating means and for driving said belt.

20. In a station indicator, the combination with means for indicating the names of stations, of supplemental means for indicating whether or not a stop is to be made at a station indicated by said station indicating means, a belt provided with a plurality of pins adjustable to and from positions in which they will actuate said supplemental means, means for actuating the station indicating means, and means for operating said actuating means and for driving said belt.

21. In a station indicator, the combination with means for indicating the names of stations, of supplemental means for indicating matter relating to the matter indicated by the station indicating means, means for actuating the station indicating means, a belt having means adjustable thereon to and from positions in which said adjustable means will actuate said supplemental means, and means for driving said belt and operating said first named actuating means.

In testimony whereof I have signed my name to this specification in presence of two subscribing witnesses.

CLINTON B. CASNER.

Witnesses:
E. B. House,
R. E. Hamilton.